US009189758B2

(12) United States Patent
Soundararajan et al.

(10) Patent No.: US 9,189,758 B2
(45) Date of Patent: *Nov. 17, 2015

(54) ADMINISTRATION OF A NETWORK

(75) Inventors: Vijayaraghavan Soundararajan, Palo Alto, CA (US); Emre Celebi, Mountain View, CA (US); Harish Muppalla, Sunnyvale, CA (US); Lawrence Spracklen, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 13/594,633

(22) Filed: Aug. 24, 2012

(65) Prior Publication Data

US 2013/0346519 A1    Dec. 26, 2013

Related U.S. Application Data

(60) Provisional application No. 61/664,108, filed on Jun. 25, 2012.

(51) Int. Cl.
*G06Q 10/06*     (2012.01)
*H04L 12/26*     (2006.01)
*H04L 12/24*     (2006.01)
*G06Q 50/00*     (2012.01)

(52) U.S. Cl.
CPC ............ *G06Q 10/06* (2013.01); *H04L 41/0893* (2013.01); *H04L 43/08* (2013.01); *G06Q 50/01* (2013.01)

(58) Field of Classification Search
CPC .... H04L 41/0893; H04L 43/08; G06Q 10/06; G06Q 51/01
See application file for complete search history.

(56) References Cited

U.S. PATENT DOCUMENTS

| 5,463,768 | A  | * | 10/1995 | Cuddihy et al. | ............. | 714/37 |
| 5,542,047 | A  | * | 7/1996  | Armstrong      | ............. | 709/224 |
| 6,829,639 | B1 | * | 12/2004 | Lawson et al.  | ............. | 709/224 |
| 7,743,332 | B2 | * | 6/2010  | Clark et al.   | ............. | 715/736 |
| 7,975,165 | B2 |   | 7/2011  | Shneorson et al. | | |
| 8,005,909 | B2 |   | 8/2011  | Raman          | | |
| 8,234,218 | B2 |   | 7/2012  | Robinson et al. | | |
| 8,392,496 | B2 | * | 3/2013  | Linden et al.  | ............. | 709/201 |
| 8,438,216 | B2 |   | 5/2013  | Runcie et al.  | | |
| 8,464,275 | B2 | * | 6/2013  | Surlaker et al. | ............ | 719/314 |
| 8,544,016 | B2 |   | 9/2013  | Friedman et al. | | |
| 8,549,002 | B2 | * | 10/2013 | Herter et al.  | ............. | 707/737 |
| 8,635,613 | B1 |   | 1/2014  | Vargas et al.  | | |
| 8,713,165 | B2 | * | 4/2014  | Bharadwaj      | ............. | 709/224 |
| 8,825,679 | B2 |   | 9/2014  | Kikin-Gil et al. | | |

(Continued)

*Primary Examiner* — Krista Zele
*Assistant Examiner* — Matthew Lindsey

(57) ABSTRACT

A computer-implemented method to facilitate administration of a network of members. Members of a network are provided with access to a shared message stream such that the members of the network are able to monitor messages generated by other members of the network posted to the shared message stream, wherein at least some of the messages are indicative of operational conditions of particular other members which generated the messages. Responsive to a first member of the network identifying a specific operational condition of the first member, the shared message stream is monitored for a message related to the specific operational condition. Provided the shared message stream includes a message related to the specific operational condition identified by the first member, an association of the message with an indication that the first member identifies with the specific operational condition is established, wherein the first member is configured to establish the association.

25 Claims, 10 Drawing Sheets

(56) References Cited

U.S. PATENT DOCUMENTS

| | | |
|---|---|---|
| 2004/0240462 A1* | 12/2004 | T V et al. ............... 370/432 |
| 2005/0188240 A1* | 8/2005 | Murphy et al. ............ 714/4 |
| 2006/0117101 A1* | 6/2006 | Lauer et al. ............ 709/224 |
| 2008/0098309 A1 | 4/2008 | Fries et al. |
| 2008/0104172 A1 | 5/2008 | Craig |
| 2008/0104679 A1 | 5/2008 | Craig |
| 2008/0275979 A1* | 11/2008 | Saba ..................... 709/223 |
| 2009/0222750 A1* | 9/2009 | Jain et al. ............. 715/767 |
| 2009/0300151 A1 | 12/2009 | Friedman et al. |
| 2009/0300502 A1 | 12/2009 | Johnson et al. |
| 2010/0332889 A1 | 12/2010 | Shneorson et al. |
| 2011/0055372 A1 | 3/2011 | Elyashev et al. |
| 2011/0106718 A1 | 5/2011 | Roberts et al. |
| 2011/0185234 A1* | 7/2011 | Cohen et al. ............. 714/37 |
| 2011/0289159 A1* | 11/2011 | Delucca et al. ......... 709/206 |
| 2012/0096352 A1 | 4/2012 | Maor et al. |
| 2012/0203899 A1* | 8/2012 | Ganapathy et al. ..... 709/224 |
| 2012/0209850 A1 | 8/2012 | Kikin-Gil et al. |
| 2012/0226803 A1 | 9/2012 | Bharadwaj |
| 2012/0254284 A1* | 10/2012 | Tamura ................... 709/202 |
| 2012/0266081 A1 | 10/2012 | Kao |
| 2013/0014033 A1 | 1/2013 | Hamick et al. |
| 2013/0014158 A1 | 1/2013 | Bhatia et al. |
| 2013/0066962 A1 | 3/2013 | Scherzinger et al. |
| 2013/0174177 A1* | 7/2013 | Newton et al. .......... 718/105 |
| 2013/0191464 A1* | 7/2013 | Burckart et al. ........ 709/206 |
| 2013/0311222 A1 | 11/2013 | Chaturvedi et al. |
| 2013/0332922 A1 | 12/2013 | Entezari et al. |
| 2013/0346518 A1 | 12/2013 | Soundararajan et al. |

* cited by examiner

400

```
IDENTIFY AT LEAST A PORTION OF THE MEMBERS OF A VIRTUALIZATION
INFRASTRUCTURE
410

FOR A RESPECTIVE MEMBER OF THE VIRTUALIZATION INFRASTRUCTURE,
    IDENTIFY THE CHILD MEMBERS OF THE RESPECTIVE MEMBER
    412

IDENTIFY WHETHER THE CHILD MEMBERS ARE ACTIVE PARTICIPANTS OF
    THE SOCIAL NETWORK OR PASSIVE PARTICIPANTS OF THE SOCIAL
    NETWORK, WHEREIN THE ACTIVE PARTICIPANTS ARE ABLE TO GENERATE
    A MESSAGE TO A SHARED MESSAGE STREAM OF THE SOCIAL NETWORK
    414
```

```
IDENTIFY PARENT/CHILD RELATIONSHIPS OF IDENTIFIED MEMBERS OF THE
VIRTUALIZATION INFRASTRUCTURE
420
```

```
GENERATE A SOCIAL NETWORK OF THE IDENTIFIED MEMBERS OF THE
VIRTUALIZATION INFRASTRUCTURE BASED ON THE PARENT/CHILD RELATIONSHIPS
430
```

```
ESTABLISH AFFILIATION RELATIONSHIPS BETWEEN PARENT MEMBERS AND CHILD
MEMBERS OF THE VIRTUALIZATION INFRASTRUCTURE, WHEREIN THE CHILD
MEMBERS CAN ACCESS SHARED MESSAGE STREAMS CORRESPONDING TO THE
PARENT MEMBERS, SUCH THAT A CHILD MEMBER CAN ESTABLISH AN ASSOCIATION
OF A MESSAGE WITH AN INDICATION THAT THE CHILD MEMBER IDENTIFIES WITH
CONTENT OF THE MESSAGE
440
```

```
RECEIVE RESPECTIVE INDICATIONS THAT PARTICULAR MEMBERS OF THE
NETWORK ARE FOLLOWING OTHER PARTICULAR MEMBERS OF THE
NETWORK
512
```

↓

```
RESPONSIVE TO RECEIVING THE RESPECTIVE INDICATIONS, DETERMINE
THAT THE OTHER PARTICULAR MEMBERS OF THE NETWORK ARE
FOLLOWING THE PARTICULAR MEMBERS OF THE NETWORK
514
```

↓

```
MAINTAIN A MAPPING OF THE MEMBERS, THE MAPPING BASED AT LEAST
IN PART ON THE RESPECTIVE INDICATIONS AND THE DETERMINING THAT
THE OTHER PARTICULAR MEMBERS OF THE NETWORK ARE FOLLOWING
THE PARTICULAR MEMBERS OF THE NETWORK
516
```

```
RESPONSIVE TO AN ADMINISTRATIVE MEMBER OF THE NETWORK POSTING AN
ADMINISTRATIVE MESSAGE TO THE SHARED MESSAGE STREAM, PERFORM AN
OPERATION IDENTIFIED IN THE ADMINISTRATIVE MESSAGE, PROVIDED THE
ADMINISTRATIVE MEMBER HAS SUFFICIENT ADMINISTRATIVE PRIVILEGES TO
AUTHORIZE THE OPERATION
550
```

FIG. 5F

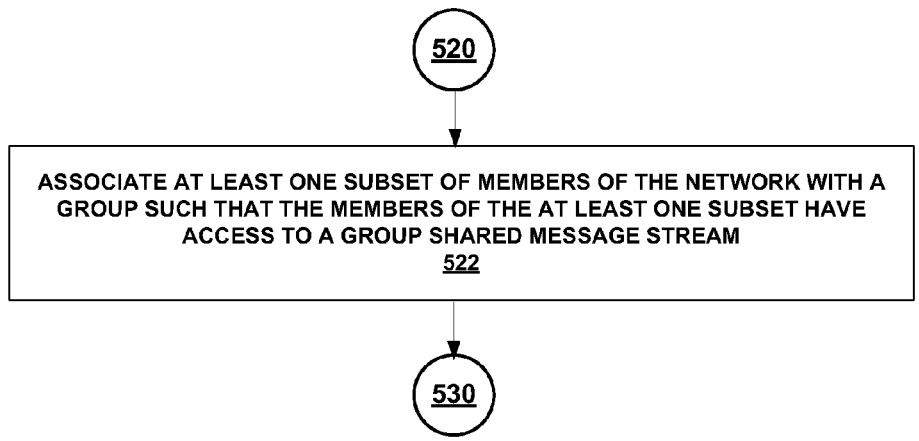

ADMINISTRATION OF A NETWORK

CROSS-REFERENCE TO RELATED APPLICATIONS

This application claims priority to and benefit of U.S. Provisional Patent Application No. 61/664,108, filed on Jun. 25, 2012, entitled "A SOCIAL-MEDIA APPROACH TO VIRTUALIZATION MANAGEMENT" by Soundararajan, et al., and assigned to the assignee of the present application.

BACKGROUND

Administration of virtualization infrastructures, such as virtual datacenters, is increasingly complex. One of the biggest challenges in virtualized deployments is keeping track of the basic health of the infrastructure. Administrators would like to quickly be informed when problems occur and would also like to have guidance about how to solve issues when they arise. These problems are frequently exacerbated as the virtualized deployments increase in scale. Conventional means for monitoring these large environments typically focus on aggregating and summarizing the amount of data to manageable quantities. Reducing this data is typically challenging, in that both identifying serious issues in the virtualization and intelligent data visualization techniques are valuable.

Automated techniques for monitoring the health of virtualization infrastructure have become increasingly prevalent and helpful. Such approaches typically leverage the collection and analysis of a large number of metrics across an environment in order to provide a concise, simplified view of the status of the entire environment. However, despite the success of such tools, significant amounts of training is often still required in order to obtain to obtain proficiency at understanding and using the output of such tools.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 4A-4D are flow diagrams of example operations of a method for creating a social network of members of a virtualization infrastructure, according to various embodiments of the present invention.

FIGS. 5A-5F are flow diagrams of example operations of a method for facilitating administration of a network of members, according to various embodiments of the present invention.

DESCRIPTION OF EMBODIMENTS

Figure 1:
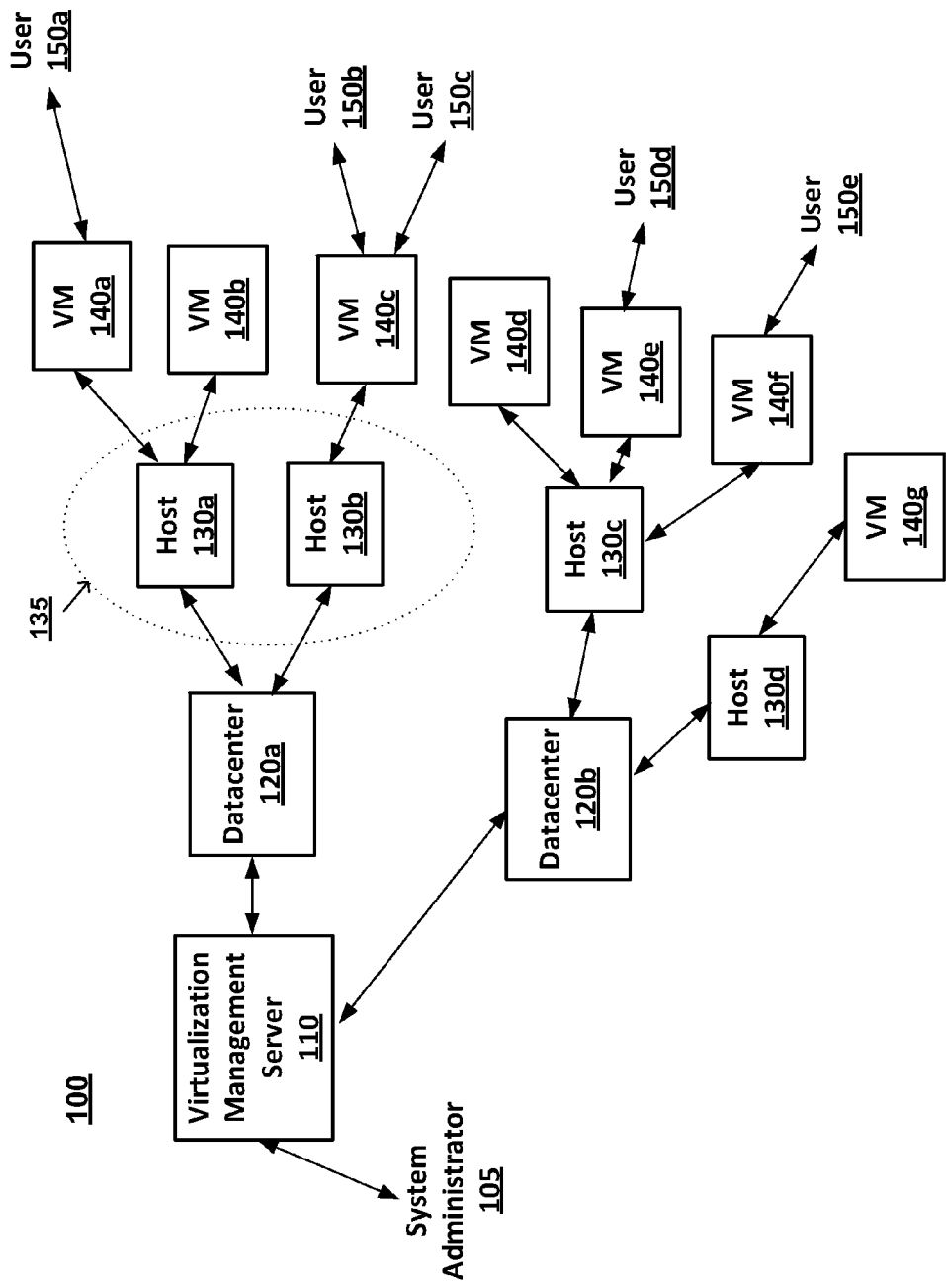
FIG. 1 illustrates an example network upon which embodiments of the present invention can be implemented.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "identifying," "generating," "establishing," "updating," "cancelling," "adding," "providing," "posting," "determining," "weighting," "increasing," "mapping," "receiving," "maintaining," "monitoring," or the like, often refer to the actions and processes of an electronic computing device or system, such as a virtualization management server or a virtual machine (VM), among others, of a virtualization infrastructure. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, the administration of virtualization infrastructures is a complex endeavor. A typical virtualization administrator may be responsible for the management of hundreds of hosts and thousands of VMs. Typically, virtualization administrators are reliant on virtualization administration tools that provide a plethora of information. However, it is often difficult to distill this information into a manageable form due to the large scale of many virtualization deployments.

Embodiments of the present invention provide for the creation of a social network of members of a network of members. For instance, where the network is a virtualization infrastructure, the members of the virtualization infrastructure are mapped into a social network based on the parent/child relationships of the members. Affiliation relationships are established between parent members and child members of the virtualization infrastructure, allowing members to "follow" other members.

Embodiments of the present invention utilize social networking between members of the virtual infrastructure to provide aggregated and summarized management data to an administrator. In various embodiments described herein, a virtualized environment is mapped into a social network. For example, members of the social network may include, without limitation, human members, such as system administrators and VM users, and non-human members such as hosts, VMs, and administration servers. Members of the virtualization infrastructure are able to contribute status updates to a shared message stream. Members are also able to monitor the shared message stream for messages related to specific operational conditions identified by the individual members. If the shared message stream includes a message related to the detected operational condition, members can associate an indication with a message that the specific operational condition has been detected by a particular member. In one embodiment, the message is weighted according to the number of indications associated with the message (e.g., "likes") by other members of the network.

In accordance with various embodiments, the social network is arranged according to a hierarchy of the virtualized environment, such that information having a sufficient level of importance is directed to a system administrator atop the hierarchy. For instance, if a sufficient number of members associate indications of a detected operational condition with a member, the message is forwarded to a system administrator. In various embodiments, a command is performed in response to a system administrator posting an administrative message to a shared message board. Embodiments of the present invention, by combining the reduction of information with the ability to perform basic virtualization management operations in response to such information within the context of a social network, provides an intuitive, platform-independent system for the creation, monitoring, and management of a virtualized environment.

Discussion begins with a description of a comparison of virtualization infrastructures to social networks. Creation of a social network based on the members of the network is then described. Monitoring and management of the members of the social network is then described. Operation of various processes of involved in the creation of the social network and the management of the members of the social network are then described, including examples of creating a social network for members of a virtualization infrastructure, and monitoring the operation of the members of the virtualization infrastructure.

Comparison of Virtualization Infrastructures to Social Networks

FIG. 1 illustrates a virtualization infrastructure 100 upon which embodiments of the present invention can be implemented. Virtualization infrastructure 100 may be used, for example, to provide hardware virtualization enterprise services. Virtualization infrastructure 100 includes various network nodes working in tandem to provide virtualization. As illustrated, virtualization infrastructure 100 includes virtualization management server 110, datacenters 120a and 120b, hosts 130a-d, and VMs 140a-g. It should be appreciated that virtualization infrastructure 100 may include any number of virtualization management servers, datacenters, hosts, and VMs, and that the number of components shown in FIG. 1 is for illustrative purposes only.

It should be appreciated that virtualization infrastructure 100 includes physical members and logical groups. As FIG. 1 illustrates, virtualization management server 110 includes datacenter 120a, which in turn includes hosts 130a and 130b. Hosts 130a and 130b also are members of cluster 135. Cluster 135 includes VMs 140a-c. In one embodiment, the hierarchy of virtualization infrastructure 100 can be mapped to a social network. In other embodiments, system administrator 105 and users 150a-e are humans that interact with virtualization infrastructure 100.

For example, members of virtualization infrastructure 100 can establish affiliation relationships with other members. For purposes of the instant application, an affiliation relationship refers to a connection between two members of virtualization infrastructure 100 in which each of the members of the affiliation relationship have the ability to receive and monitor each other's status. For example, in Socialcast®, the affiliation relationship is referred to as "following." In other social network applications, the affiliation relationship may refer to "friends" or "connections." It should be appreciated that while different terms may be used to describe an affiliation relationship, an affiliation relationship generally affords its members privileges regarding the access of and commenting on the status of its members, and that these terms can be used interchangeably.

Continuing with the example, a system administrator 105 can "follow" virtualization management server 110. In turn, virtualization management server 110 can follow hosts 130a and 130b. Host 130a can follow VMs 140a and 140b, and host 130b can follow VM 140c. It should be appreciated that the hierarchy provides a manner for limiting information flow.

Figure 2:
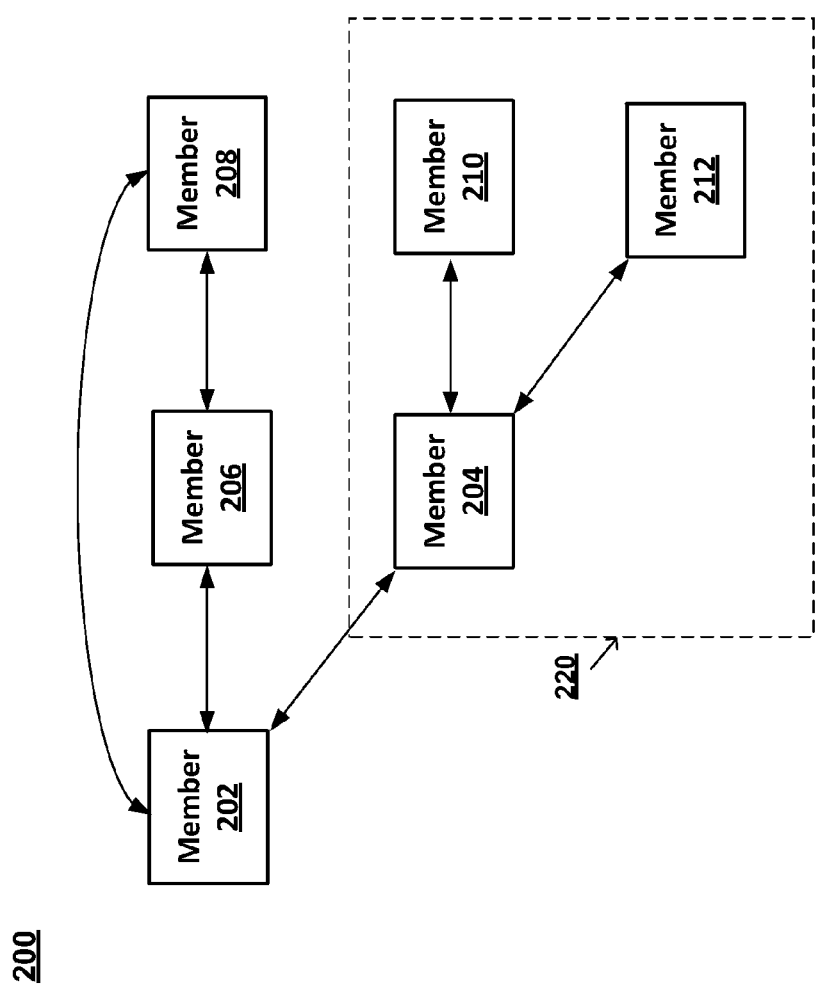
FIG. 2 illustrates an example social network, according to various embodiments of the present invention.

FIG. 2 illustrates an example social network 200, according to various embodiments of the present invention. For purposes of the description of FIG. 2, a two-way arrow suggests an affiliation relationship (e.g., a friend relationship or a following relationship). For example, member 202 is friends with member 204 and member 204 is friends with member 212, but member 212 is not friends with member 202. In addition, member 204, 210 and 212 might choose to create a separate, private group 220. It should be appreciated that there is a distinction between physical entities, namely the members of social network 200, and the logical entities, such as group 220.

In a social network, member 202 may choose instead to only be friends with member 204, knowing that if anything interesting happens to members 210 and 212, that member 204 will likely collect such information and share it with member 202. In a similar manner, with reference to FIG. 1, virtualization management server 110 need not choose to be friends with all VMs 140a-g, but just with hosts 130a-d. If a host receives enough status updates from the VMs running on it, it may choose to signal a status change to virtualization management server 110. In a similar way, system administrator 105 may choose to be friends only with virtualization management server 110, knowing that virtualization management server 110 can accumulate status updates and propagate them to system administrator 105.

It should be appreciated that datacenters, clusters, and resource pools are not included as having affiliation relationships in a social network of a virtualization infrastructure, because they do not have a physical manifestation. In other words, while system administrator 105 can send and receive network packets to/from VMs and hosts, system administrator 105 cannot send a message to a datacenter. Instead, a datacenter, cluster, resource pool, and host/VM folders are more similar to a group in a social network. However, it should be appreciated that a datacenter, as well as clusters, might be associated with other components, such as processors and controllers that might be able to send or receive messages. It should also be appreciated that the notion of a group can also refer to user-defined collections of member. For example, it may be helpful to put all VMs that run a particular application in a given group, or it might be helpful to put all VMs under a given resource pool in a given group.

Creation of a Social Network

Figure 3:
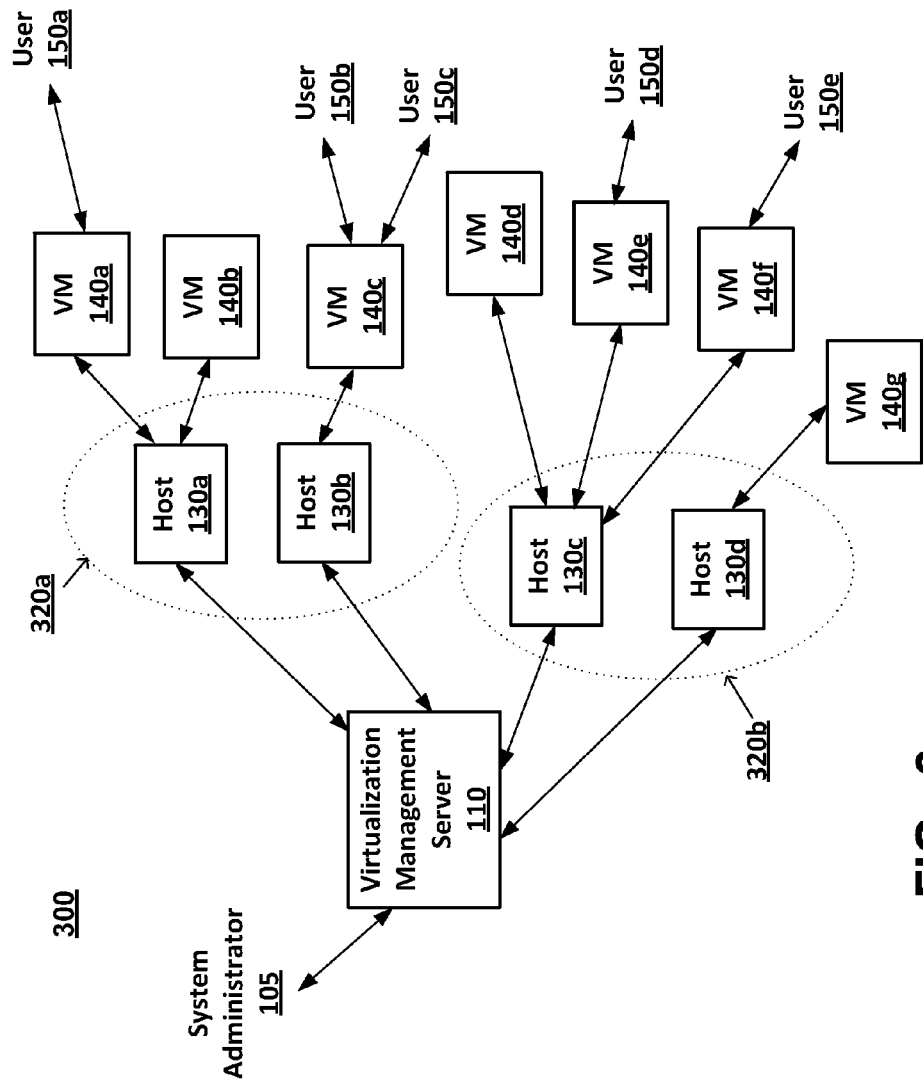
FIG. 3 illustrates an example social network based on a virtualization infrastructure, according to various embodiments of the present invention.

Embodiments of the present invention provide for creating a social network of members of a virtualization infrastructure. FIG. 3 illustrates an example social network 300 based on a virtualization infrastructure, according to various embodiments of the present invention. Social network 300 is populated with members of virtualization infrastructure 100.

At least a portion of the members of the virtualization infrastructure are identified at a virtualization infrastructure manager. In one embodiment, virtualization management server 110 is able to start at any node (e.g., member) of virtualization infrastructure 100 and locate all children of that node. In one embodiment, the virtualization management server 110 allows for the specification of the type of children to be located. For example, virtualization management server 110 may be directed to select all VMs within a datacenter (e.g., VMs 140*a-c* of datacenter 120*a*). It should be appreciated that these children do not have to be the immediate children with a datacenter. For example, with reference to FIG. 1, given the identification of the datacenter (e.g., datacenter 120*a*) and the identification of the type as "Virtual Machine," VMs 140*a-c* would be identified. In one embodiment, the parent-child relationships are in accordance with the VMware Virtual Infrastructure Methodology application programming interface (API).

As presented above, note that some children are not active participants in a social network. For example, a cluster is a logical construct, not a physical one, since a cluster itself cannot send/receive a message. In contrast, a host or VM can send/receive messages. In one embodiment, a member is pinged to determine whether it is an active participant in the social network. For purposes of the instant application, active participants refer to members that can send/receive messages and passive participants refer to members that are not able to send/receive messages themselves.

Upon identifying the parent/child relationships of the members of virtualization infrastructure 100, social network 300 is generated having the hierarchy of virtualization infrastructure 100. Affiliation relationships between the parent and child members of virtualization infrastructure 100 are established (e.g., follower/followee relationships or friend relationships. For example, host 130*c* follows its VMs 140*d-f*, and users 150*d* and 150*e* follow VMs 140*e* and 140*f*, respectively. In addition, virtualization management server 110 follows hosts 130*a-d*. Moreover, hosts 130*a-d* can join groups corresponding to their datacenters, such that hosts 130*a* and 130*b* are in group 320*a* corresponding to datacenter 120*a*. Similarly, hosts 130*a-d* can join groups without corresponding datacenters, e.g., hosts 130*c* and 130*d* are in group 320*b*. It should be appreciated that many different types of groups may be used in accordance with the described embodiment. For example, clusters can include hosts (or VMs), resource pools can include VMs. In another example, a parent member can be a group, e.g., host X following VMs Y, N, and Z, and can have a separate group called "Host X" in which VMs Y, N, and Z are members. Furthermore, special groups are also available, e.g., VMs running particular applications are grouped together. For example, group 320*b* might represent VMs running a particular application.

VMs 140*a-g* are able to post to shared message streams of a group corresponding to their parent host. In one embodiment, the child members can access shared message streams corresponding to the parent members, such that a child member can establish an association of a message with an indication that the child member identifies with content of the message, e.g., can "like" the message.

In various embodiments, the social network affiliation relationships are updated in response to a member being removed from or being added to virtualization infrastructure 100. In one embodiment, the social network affiliation relationships are updated in response to a member moving with virtualization infrastructure 100, e.g., a vMotion® has occurred. For example, when a VM moves from one host to another host, virtualization management server 110 detects the movement. Responsive to the VM moving, the affiliation relationships are updated such that the source host "unfollows" the VM and the destination host "follows" the VM.

Various embodiments of the present invention can be implemented using Socialcast®, a social network platform providing sophisticated messaging between members of the social network. The following is a brief description of social media messaging in Socialcast®. There are several kinds of messages in Socialcast®. There are community streams, in which a group of members subscribe to a given topic and see messages related to that topic. There are also private messages, which are messages directed to a particular member and not viewable by other members. There are comments, in which members can respond to existing stream messages, and there are private message replies, which are similar to comments, but are responses to private messages. Messages and comments can be liked (in which other members express approval) or un-liked (in which other members express disapproval). Messages can be tagged with categories or filtered by content. Finally, members can be followed: if member A is followed by member B, then when member A makes comments, member B is notified of them. This allows member B to be aware of the status of member A.

Based on this description of the message types in Socialcast®, the following describes portions of the Socialcast® API:

1. Messages API: The messages API allow a member to read a single stream message or a group of stream messages, create new messages, update new messages, destroy messages, and search messages. A member can also specify the retrieval of messages since a certain date, the retrieval of messages that fit certain criteria, etc.
2. Likes API: The likes API allows a member to like a message or un-like a message
3. Comments API: The comments API allows a member to retrieve comments, create comments, update comments, or delete comments. There is also a "comment likes" API where a member can like or un-like a comment.
4. Flagging API: The flagging API allows messages to be flagged (and un-flagged)
5. Private Messages API: The private messages API allows a member to perform all of the same actions as in the standard messages API, but for private messages.
6. Users API: The members API allows a member to retrieve information about other members, search for members, deactivate members, and retrieve messages from a specific member.
7. Follow/Unfollow API: The follow API allows users to "follow" other members (e.g., see comments or notifications by the other members).
8. Groups API: The groups API allows members to list groups, the members of groups, and group memberships of a given member.
9. Attachments API: The attachments API allows a member to create attachments (either separately or as part of a message).

In one embodiment, the above-referenced commands are Hypertext Transfer Protocol (HTTP) GET or POST requests. Installing a library such as libCurl in VMs enables the VMs to programmatically send status and receive status. Adding this library to a host further enables a host to send and receive status. The ability to programmatically interact with messages, groups, etc., allows the hosts and VMs be members in the virtualization social network in the same way that human beings are members of the virtualization social network.

Embodiments of the present invention can also be implemented using other programming languages, such as Perl, Python or Ruby.

In one embodiment, an agent is installed as a service/daemon that starts running as soon as the operating system (OS) of a member starts. At initialization the agent retrieves a unique identifier that can be used to uniquely identify the OS to Socialcast®. For instance, the unique identifier can be the Media Access Control (MAC) address. The Socialcast® server is queried (using the MAC address as its Socialcast® username) to determine necessary configuration information, including internal Socialcast® identifiers and groups and streams to which the agent should monitor/post. It should be appreciated that alternatives to the MAC address can be used. For example, the universally unique identifier (UUID) for a VM can be used, as the UUID uniquely identifies the VM among all other VMs. In one embodiment, it is determined if there are special virtualization applications running for which additional monitoring can be performed. In the present embodiment, the Socialcast® profile photo is updated based on the operating system and applications that are running.

In one embodiment, the Internet Protocol (IP) address of the Socialcast® server is hardcoded in the VMs. However, it should be appreciated that the IP address of the Socialcast® server can be included in a VM when the VM is deployed. Moreover, in one embodiment, users are created in Socialcast® using the MAC address of the associated members as the username and email. For example, a VM wakes up and logs into Socialcast® using its MAC address. The Socialcast® server sends a private message to the VM that contains the VM's Socialcast® identifier (ID). Once the VM receives its Socialcast® ID, the Socialcast® ID can be used in all future correspondence (e.g., posting public messages, sending messages to groups, etc.) using Socialcast®. As described herein, in one embodiment, the initial login to the Socialcast® server only requires a member's MAC address and a password, rather than the Socialcast® ID. The Socialcast® server can send the Socialcast® ID over the private message channel to provide a member with its Socialcast® ID.

Monitoring and Management of the Members of the Social Network

Embodiments of the present invention facilitate administration of a network of members. While the embodiments described herein are directed toward monitoring a social network of members of a virtual infrastructure, it should be appreciated by one of skill in the art that the described embodiments are not limited as such. In particular, embodiments of the present invention may be used to facilitate the management of any network of members for which messaging between members is available.

As described herein, embodiments of the present invention combine management of a virtualization infrastructure with a social network platform, providing intuitive virtualization infrastructure management. The virtualization infrastructure is organized into a social network, including both human members, such as system administrators and user, and non-human members, such as virtualization management servers, hosts and VMs. Members of the social network are able to contribute status updates, whether manually (e.g., human members) or programmatically (e.g., via automated scripts running on VMs and hosts). The social network is organized according to the hierarchy in a virtualized infrastructure, enabling the limiting of information flow so that only important or relevant updates reach a system administrator. Moreover, in various embodiments, the system administrator is capable of performing commands within the social network.

As described above with reference to FIG. 3, a system administrator 105 joins social network 300 and "follows" a virtualization management server 110 to receive timely updates about the status of the virtualization infrastructure. Virtualization management server 110 executes social network agent that allows it to "follow" hosts and their status updates. This agent uses the messaging capabilities of the social network platform, such as Socialcast® (e.g., posting messages to lists, deleting messages from lists, sending replies in response to messages, etc.) to apprise system administrator 105 of useful events. Similarly, hosts 130a-d include a similar social network agent and can "follow" VMs and be organized into groups (e.g., clusters), and VMs can be organized into groups based on application type, such as applications running on the VMs or VMs belonging to a particular user.

By creating a hierarchy from a system administrator to the host to the VM, and allowing each to post status updates to relevant communities, a system administrator can stay informed about the status of a datacenter. By utilizing message capabilities, system administrators can even send commands to hosts or VMs. Moreover, by configuring the types of status that are sent, and the data source for status updates, and by allowing rich uniform resource locators (URLs) in messages for checking status, a system administrator can do first-level triaging of issues in a large virtualized environment.

Members of a network are provided with access to a shared message stream, such that the members of the network are able to monitor messages generated by other members of the network posted to the shared message stream. At least some of the messages are indicative of operational conditions of particular other members which generated the messages. In response to a first member of the network identifying a specific operational condition of the first member, the shared message stream is monitored for a message related to the specific operational condition. Provided the shared message stream includes a message related to the specific operational condition identified by the first member, an association of the message with an indication that the first member identifies with the specific operational condition is established (e.g., the first member "likes" the message), wherein the first member is configured to establish the association.

If important events (e.g., operational conditions) occur, notifications are sent to a system administrator. These notifications are might be acknowledged and then cleared by the system administrator. Multiple similar issues may happen among a group of hosts or VMs, suggesting a common root cause. Messages can be flagged according to severity, and messages with common headers can be additionally categorized.

As illustrated in FIG. 3, a system administrator 105 follows virtualization management server 110, which in turn follows hosts 130a-d, which in turn follow VMs 140a-g, respectively. In various embodiments, were hosts are arranged in clusters, a set of hosts might be organized into a group named after the parent cluster. VMs may reside in folders or resource pools, so VMs may be placed in groups based on parent folder or resource pool. It should be appreciated that various types of groupings are available, and not limited to the described embodiments. For example, physical hosts that belong in rack X can go into a group named X, or every VM running Microsoft Exchange can go into a group named "Microsoft Exchange." A system administrator might decide to join such a group of VMs.

For instance, when a VM encounters an issue like a virtual hard drive running out of space, the VM can perform an HTTP POST request to indicate its status (e.g., "ERROR: VM hard drive out of space") using the messages API. In the present embodiment, a custom stream has been created, and when a message is sent to virtualization management server 110, the message is parsed. Because the message is from a "VM" and contains "hard disk" in the error message, the message is automatically redirected to the "VM hard disk" shared message stream. If a system administrator is periodically watching updates to this stream, he might notice a flurry of activity and choose to investigate the VM hard disks in his infrastructure. Alternatively, a host can have an agent running that automatically reads messages to a given stream, parses them, and performs certain actions as a result.

Blindly sending messages to a stream can result in an unmanageable quantity of messages to a human. To avoid such issues, a feature of the Socialcast® API is utilized: the ability to read a stream before publishing to it. For instance, if several VMs are exhibiting the same issues (e.g., hard drive failures), rather than each posting to the same stream and inundating an administrator with messages, the Socialcast® agent on each VM can programmatically read the public stream and find out if such a message already exists. If so, the VM can "like" the message instead of adding a new message to the stream. In this manner, a system administrator that is subscribed to this group will not be overwhelmed with messages: instead, the administrator will see a single error message with a large number of "like" messages. This may suggest to the administrator that something is seriously wrong with some shared resource associated with these VMs.

Similarly, consider a host that is following each of its VMs. The host can use a simple loop to poll for status updates by its VMs. When enough such ERROR messages are detected, the host might decide to post an aggregated "ERROR: VM disk failures" to its status. The virtualization management server that is following this host may then choose to update its status accordingly ("ERROR: HOST X shows VM disk failures"). The system administrator, who is following this virtualization management server, will then see the appropriate status notification and may decide to investigate the host. By utilizing the hierarchical propagation of messages, a system administrator sees a greatly reduced set of error messages. The system administrator may further decide to create a special group called a "cluster," and put all hosts in that cluster in a group. The system administrator may choose to occasionally monitor the messages in the cluster group. By seeing all messages related to the cluster in one place, the system administrator may notice patterns that would not otherwise be obvious. For example, if the cluster group shows a single "host disconnect" message and a number of "likes" for that message from the other hosts, it might be the case that a power supply to a rack containing these hosts has failed, and all hosts are subsequently disconnected. Note here that the ability to read the group messages before publishing is crucial to reduce the number of messages: instead of publishing a new message, the "like" attribute is used. Depending on the type of power supply (managed or not), the power supply itself may be able to join a given social network of hosts and VMs and emit status updates.

As yet another technique for reducing information, a host or virtualization management server may utilize flags. For example, depending on the content of the messages (e.g., error messages or warning messages), a host that is following its VMs may examine a message stream, choose the messages with errors, and flag them, indicating that they are of particular importance. The host can later programmatically examine flagged messages and send a single update to the virtualization management server. The virtualization management server, in turn, can notify the system administrator with a single message.

It should be appreciated that messages do not have to be limited to static read-only content. For example, perhaps a system administrator sends a private message to a VM that includes the body of a script. When the VM reads the message, it can execute the script. Similar such commands can be sent to hosts. For example, a primitive heartbeat mechanism can also be implemented: if each VM and host is configured to send a message once a day, and if a host periodically checks to see if each VM has issued an update, the host can potentially detect if a VM has gone offline. The host could then send itself a command to power on the VM, and if no response is detected from the VM, a message can be posted by the host to the administrator's group. To prevent security issues with malicious users sending arbitrary commands to hosts and VMs, it can be implemented that only authorized community members and members of a given group (e.g., an administrators group for system administrators) are allowed to send messages to other members.

It should be appreciated that a system administrator can periodically flush old messages or messages that have been acknowledged and acted upon. Messages can be searched, providing a helpful audit trail.

In one embodiment, where an agent is installed on a member, while monitoring the performance of the member, the agent periodically awakes and performs a system health check and reports any anomalies.

The agent checks to see if the agent has been sent any new messages. These can include messages informing the agent to monitor/subscribe to different groups/streams (e.g. if a vMotion® occurred), or even, if the administrative privileges of the messages are sufficient, perform specified operations. The specified operations can include a shutdown request, a variety of predefined monitoring operations (e.g., report the processes using the most memory), or run arbitrary queries on the system. For example, for Windows systems, the Windows Management Instrumentation (WMI) interface is used to query the OS about system health. WMI supports a SQL-like query language, which can allow users to provide arbitrary queries to the agent that, in turn, the agent will run on demand and post the results to Socialcast®.

The agent can check key system metrics (including processor use, disk use and memory use) and ensure they are all within the normal healthy range. The agent keeps a running history of these metrics and adds the latest values of these metrics to agent's history buffers that are used to identify trends in the metrics and enable the agent to post plots to Socialcast® illustrating performance over a most recent time period. The agent can also check the Windows event logs to determine that no errors have been reported. The agent checks for any updates to log files for the virtualization management server (e.g., VMware vCenter™) and parses for new problems. The agent also checks that key applications are still running.

If the agent detects any problems, Socialcast® is queried to determine if this problem has already been reported in any of the groups/streams that the agent is monitoring. The agent determines which problems should be reported to which group and searches the appropriate groups for reported problems. Also, messages sent to Socialcast® by the agent include hash tags that allow the agent to perform more accurate and less computationally expensive search operations. The other benefits of the hash tags are that they provide the Socialcast® administrator significant additional insight into the trending behavioral problems of the datacenters they are monitoring. There may be one or more hash tags per message, to provide a wealth of information.

If a similar problem has already been reported to Socialcast®, the agent will "like" that existing post. If no such problem has been reported, the agent will report the problem—submitting the message to the appropriate group/stream and adding a meaningful hash tag to the message body. The agent uses generic message titles and provides additional details in the message body. The agent performs its search operations on the message title. In essence, the agent will query Socialcast® and request Socialcast® provide the agent with all messages submitted to particular group/stream, containing a particular hash tag, in the most recent time period. The agent then performs additional parsing on the messages provided by Socialcast® to determine whether there is a good match. When the agent posts a message it can upload a chart to the Socialcast® server using the agent's metric history data to illustrate how the metric has been changing over the last few hours. The agent will reference this attachment in the body of the posted message, such that the plot appears in the Socialcast® message.

In one embodiment, the attachment of a hash tag to a message creates a new topic and corresponding tag cloud in the social network. For instance, in Socialcast®, the size of the tag cloud provides an indication as to the popularity of the message. For example, if a given VM has significantly more processor hash tag messages than disk usage hash tag messages, then it is likely that the VM is experiencing more processor problems than disk usage problems.

The agent will then check to determine if problems observed during prior health checks have been resolved. If such problems have been resolved, the agent queries Socialcast® for the corresponding message. If the agent was the entity to post the message, the agent can comment on the posted message indicating it now sees the problem as resolved. If the agent merely liked an existing post, the agent can unlike the post.

Example Methods of Operation

The following discussion sets forth in detail the operation of some example methods of operation of embodiments. With reference to FIGS. 4A-D and 5A-F, flow diagram 400 and 500 illustrate example procedures used by various embodiments. Flow diagrams 400 and 500 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within virtualization infrastructure 100. The computer-readable and computer-executable instructions, which reside on tangible computer readable storage media, are used to control or operate in conjunction with, for example, one or some combination of processors of virtualization infrastructure 100. It is appreciated that the processor(s) may be physical or virtual or some combination (it should also be appreciated that a virtual processor is implemented on physical hardware). Although specific procedures are disclosed in flow diagrams 400 and 500, such procedures are examples. That is, embodiments are well suited to performing various other procedures or variations of the procedures recited in flow diagram 400 and 500, alone or in combination. Likewise, in some embodiments, the procedures in flow diagrams 400 and 500, alone or in combination, may be performed in an order different than presented and/or not all of the procedures described in one or more of these flow diagrams may be performed. It is further appreciated that procedures described in flow diagram 400 and 500, alone or in combination, may be implemented in hardware, or a combination of hardware with firmware and/or software.

FIGS. 4A-D are flow diagram 400 of a method for creating a social network of members of a virtualization infrastructure, according to various embodiments of the present invention. Although specific procedures are disclosed in flow diagram 400, embodiments are well suited to performing various other procedures or variations of the procedures recited in flow diagram 400. It is appreciated that the procedures in flow diagram 400 may be performed in an order different than presented, that not all of the procedures in flow diagram 400 may be performed, and that additional procedures to those illustrated and described may be performed. All of, or a portion of, the procedures described by flow diagram 400 can be implemented by a processor or computer system executing instructions which reside, for example, on computer-usable/readable media.

At procedure 410 of flow diagram 400, at least a portion of the members of the virtualization infrastructure are identified at a virtualization infrastructure manager. For example, with reference to FIG. 1, in one embodiment, virtualization management server 110 starts at any node (e.g., member) of virtualization infrastructure 100 and locates all children of that node. In one embodiment, the active members of the virtualization infrastructure are identified. For purposes of the instant specification, this operation is also referred to as mapping the virtualization infrastructure.

In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts.

In one embodiment, at procedure 412, the child members of the respective member are identified for a respective member of the virtualization infrastructure. In one embodiment, as shown at procedure 414, it is identified whether the child members are active participants of the social network or passive participants of the social network. As described above, wherein the active participants are able to generate a message to a shared message stream of the social network.

In one embodiment, the passive participants of the social network represent a group of the active participants. For example, datacenter 120a is a passive participant in the social network. However, it is group 320a for its connected host 130a-b and VMs 140a-c. In another embodiment, parent members that are active participants represent a group of the child members of the respective parent members that are active participants. For example, host 130a is a group for VMs 140a and 140b.

At procedure 420, parent/child relationships of the identified members of the virtualization infrastructure are identified. In one embodiment, the parent/child relationships are determined as virtualization management server 110 locates the children of the nodes.

At procedure 430, a social network of the identified members of the virtualization infrastructure based on the parent/child relationships is generated. In one embodiment, the social network is generated having the hierarchy of the virtualization infrastructure. Affiliation relationships between the parent and child members of the virtualization infrastructure are established (e.g., follower/followee relationships or friend relationships).

At procedure 440, affiliation relationships between parent members and child members of the virtualization infrastructure are established. The affiliation relationships allow for child members to access shared message streams corresponding to the parent members. A child member can establish an association of a message with an indication that the child member identifies with content of the message (e.g., "likes" the message). In one embodiment, the child member is configured to establish the association. In one embodiment, the affiliation relationships are established between respective parent members and child members that are able to generate a message to a shared message stream of the social network.

Figure 4B:
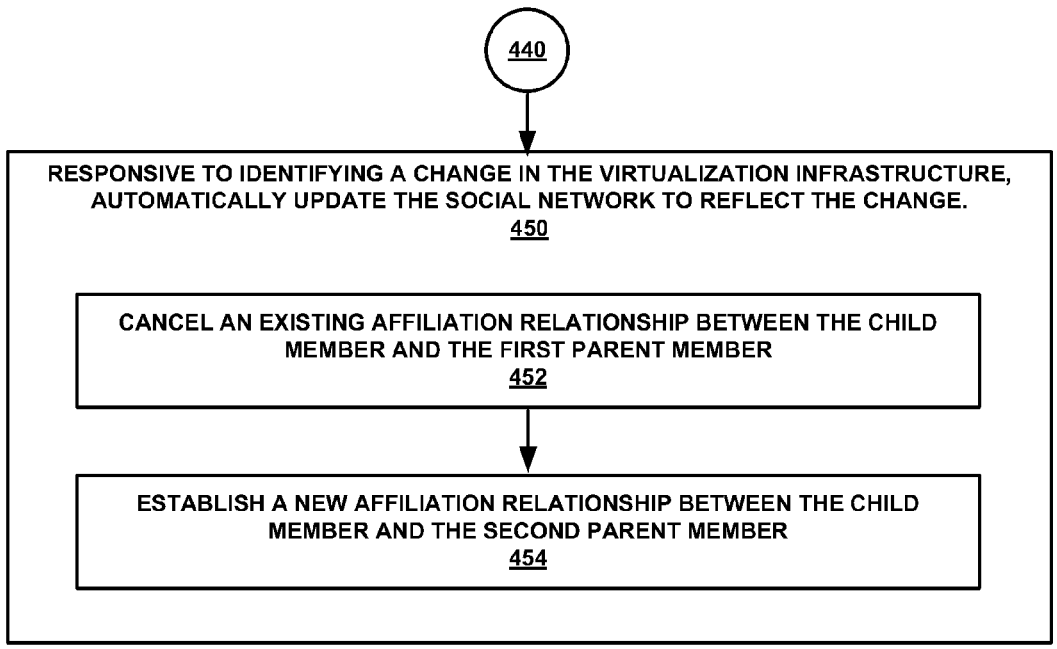

With reference to FIG. 4B, in one embodiment, flow diagram 400 proceeds to procedure 450. At procedure 450, responsive to identifying a change in the virtualization infrastructure, the social network is automatically updated to reflect the change. In various embodiments, the change in the virtualization infrastructure is the removal of a member, the addition of a member, or the movement of a child member from a first parent member to a second parent member. Where the change is the movement of a child member from a first parent member to a second parent member, as shown at procedure 452, an existing affiliation relationship between the child member and the first parent member is cancelled. At procedure 454, a new affiliation relationship between the child member and the second parent member is established.

Figure 4C:
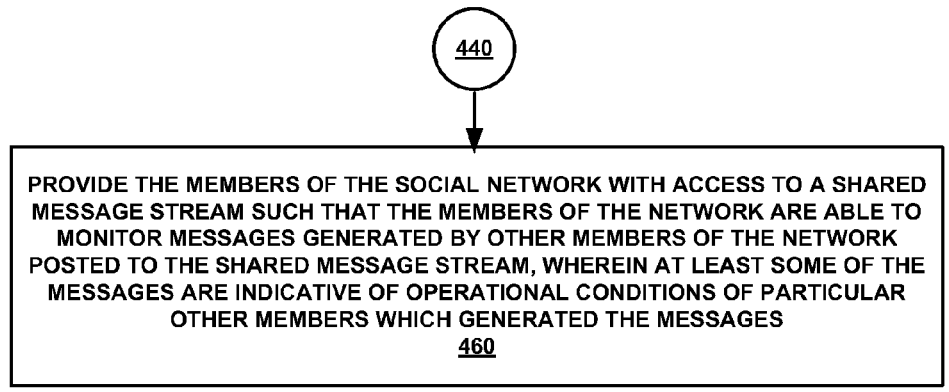

With reference to FIG. 4C, in one embodiment, flow diagram 400 proceeds to procedure 460. At procedure 460, the members of the social network are provided with access to a shared message stream such that the members of the network are able to monitor messages generated by other members of the network posted to the shared message stream. In various embodiments, at least some of the messages are indicative of operational conditions of particular other members which generated the messages.

Figure 4D:
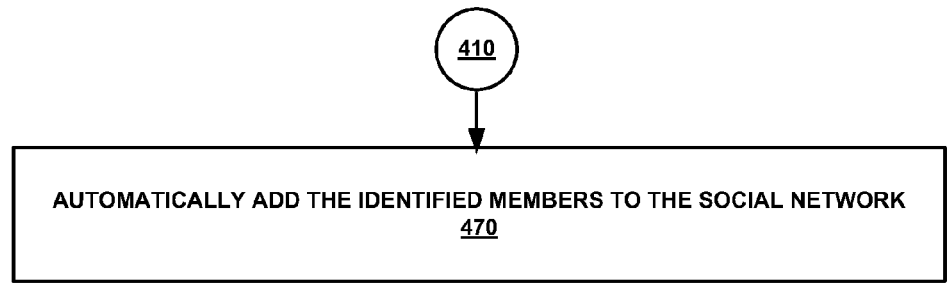

With reference to FIG. 4D, in one embodiment, flow diagram 400 proceeds to procedure 470. At procedure 470, the identified members are automatically added to the social network. For example, an identified member is created in the social network using the MAC address of the associated members as the username and email. In another embodiment, the UUID for a VM is used as the member's username and email. The social network can provide the member with its permanent access information, e.g., Socialcast® ID, over the social network using the initial login information.

FIGS. 5A-F are a flow diagram of a method for facilitating administration of a network of members, according to various embodiments of the present invention. Although specific procedures are disclosed in flow diagram 500, embodiments are well suited to performing various other procedures or variations of the procedures recited in flow diagram 500. It is appreciated that the procedures in flow diagram 500 may be performed in an order different than presented, that not all of the procedures in flow diagram 500 may be performed, and that additional procedures to those illustrated and described may be performed. All of, or a portion of, the procedures described by flow diagram 500 can be implemented by a processor or computer system executing instructions which reside, for example, on computer-usable/readable media.

At procedure 510 of flow diagram 500, the members of the network are mapped to a social network. In one embodiment, the network includes a virtualization infrastructure. In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts.

In one embodiment, this is performed in accordance with flow diagram 400 of FIGS. 4A-4D. In one embodiment, procedure 510 is performed as illustrated in FIG. 5B. At procedure 512, respective indications that particular members of the network are following other particular members of the network are received. At procedure 514, responsive to receiving the respective indications, it is determined that the other particular members of the network are following the particular members of the network. In other words, upon receiving an indication that member A is following member B, it is determined that member B is also following member A. At procedure 516, a mapping of the members is maintained, where the mapping based at least in part on the respective indications and the determining that the other particular members of the network are following the particular members of the network.

At procedure 520, members of a network are provided with access to a shared message stream such that the members of the network are able to monitor messages generated by other members of the network posted to the shared message stream. At least some of the messages are indicative of operational conditions of particular other members which generated the messages.

In one embodiment, as shown in FIG. 5C, flow diagram 500 proceeds to procedure 532. At procedure 532, at least one subset of members of the network is associated with a group such that the members of the at least one subset have access to a group shared message stream.

At procedure 530, responsive to a first member of the network identifying a specific operational condition of the first member, the shared message stream is monitored for a message related to the specific operational condition. In one embodiment, procedure 530 is performed as illustrated in FIG. 5D. At procedure 532, with respect to a specific message monitored at the first member, a relevance of the indicated operational condition of the specific message to the first member is determined. The relevance is based on compatibility of the indicated operational condition to the specific operational condition. As shown at procedure 534, in response to determining that there is compatibility of the indicated operational condition to the specific operational condition, it is determined that the specific message is related to the specific operational condition. In one embodiment, the messages include a group identifier and a hash tag providing information related to the operational condition. It should be appreciated that responsive to a request for the information provided by a particular hash tag, for example, by a system administrator, access to messages including the hash tag across the network can be provided.

For example, with reference to FIG. 3, VM 140*a* identifies a specific operational condition, e.g., it lost a connection to a particular server. VM 140a will then monitor a shared message stream for a message indicating the same condition. It should be appreciated that the shared data stream can be for host 130a (VMs 140a and 140b), for group 320a (VMs 140a-c), or for any other combination of members. A message is scanned to determine whether it is related to the specific operational condition.

Figure 5A:
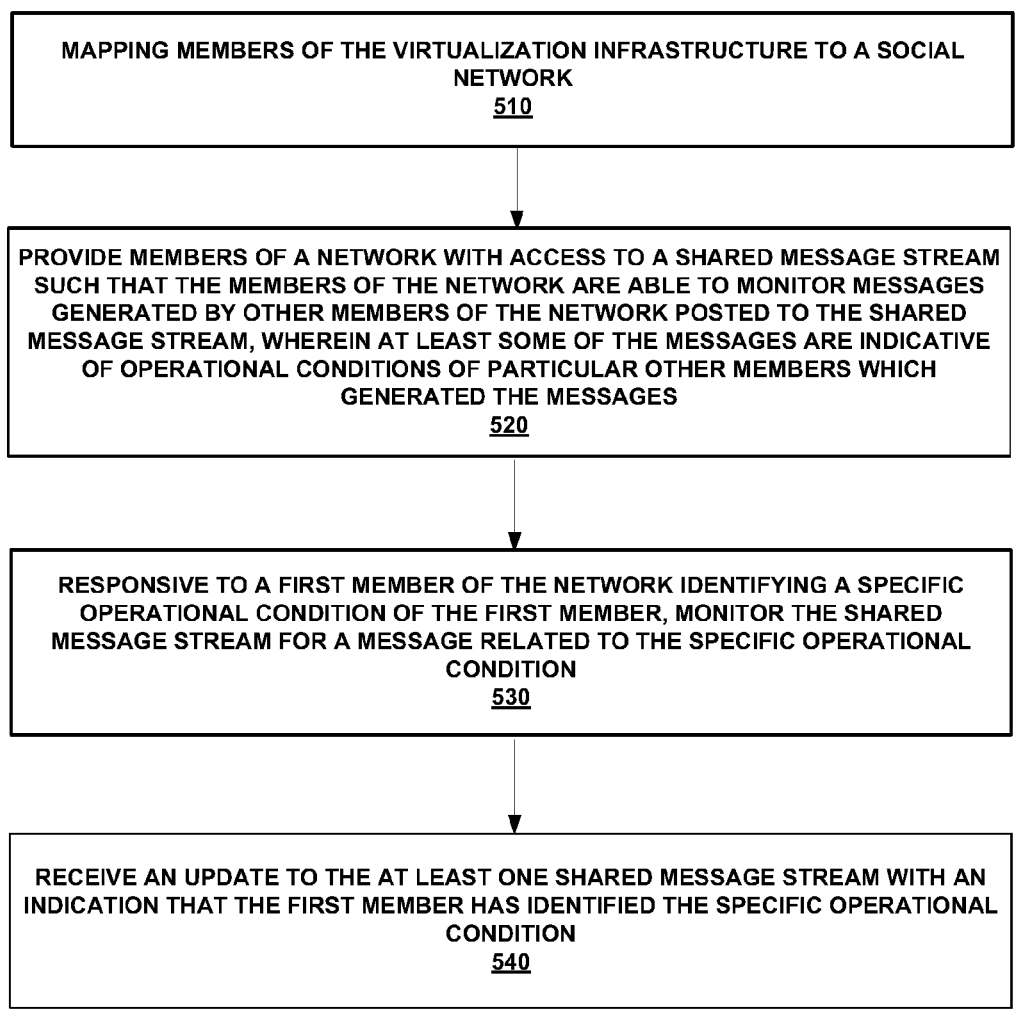
Figure 5E:
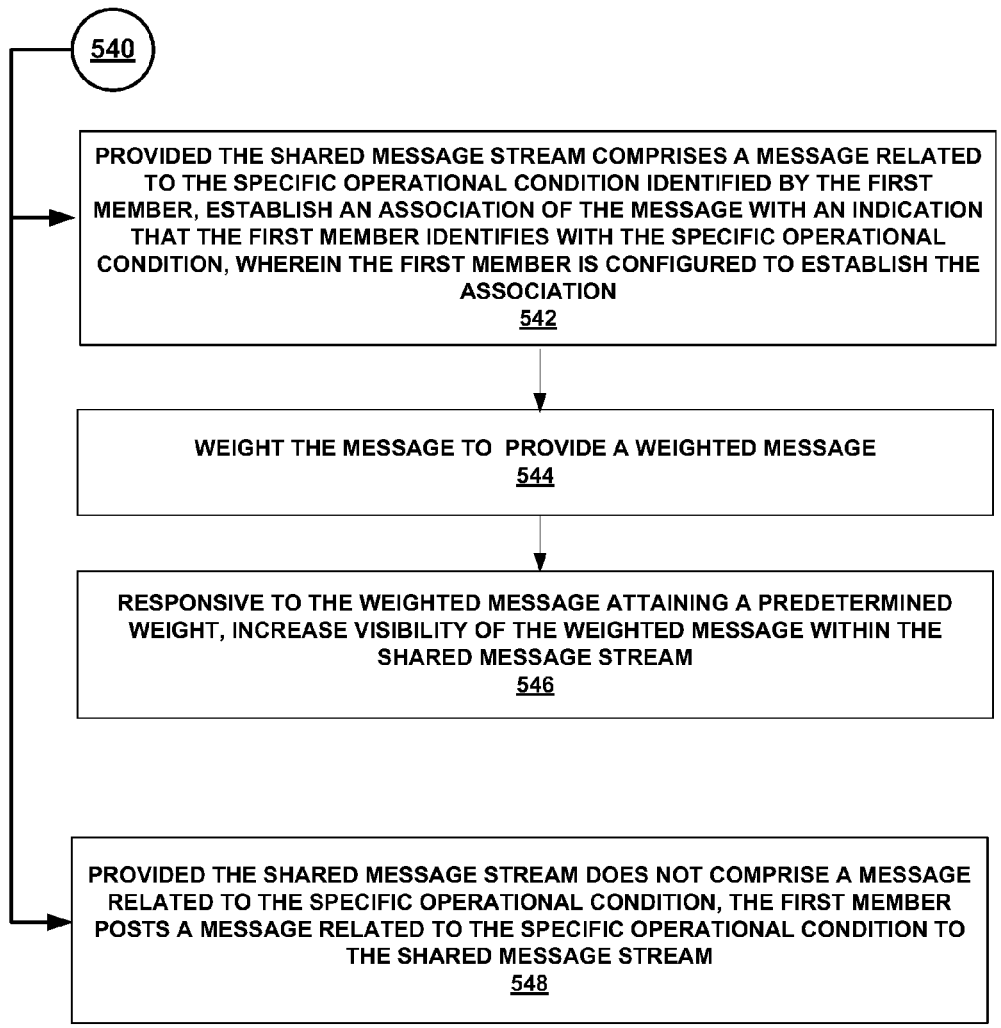

Returning to FIG. 5A, at procedure 540, an update to the at least one shared message stream is received with an indication that the first member has identified the specific operational condition. In one embodiment, procedure 540 is performed as illustrated in FIG. 5E. At procedure 542, provided the shared message stream includes a message related to the specific operational condition identified by the first member, an association of the message with an indication that the first member identifies with the specific operational condition is established, e.g., the first member "likes" the message. In one embodiment, the first member is configured to establish the association. In one embodiment, as shown at procedure 544, the message is weighted to provide a weighted message. For example, each association, or "like," adds weight to the message, increasing its relative importance. At procedure 546, responsive to the weighted message attaining a predetermined weight, the visibility of the weighted message within the shared message stream is increased. For example, upon attaining a predetermined weight, the message is propagated to the system administrator.

At procedure 548, provided the shared message stream does not include a message related to the specific operational condition, the first member posts a message related to the specific operational condition to the shared message stream. This message is available in the shared message stream for monitoring by other members, and can receive associations.

In one embodiment, as shown in FIG. 5F, flow diagram 500 proceeds to procedure 550. At procedure 550, responsive to an administrative member of the network posting an administrative message to the shared message stream, an operation identified in the administrative message is performed, provided the administrative member has sufficient administrative privileges to authorize the operation.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method to facilitate administration of a network of members, the method comprising:
    mapping the members of the network to a social network, wherein the mapping is based at least in part on respective indications that particular members of the network are following other particular members of the network, and wherein the members of the network comprise components of a virtualization infrastructure;
    providing members of the network with access to a shared message stream of the social network such that the members of the network are able to monitor messages generated by other members of the network posted to the shared message stream, wherein at least some of the messages are indicative of operational conditions of particular other members which generated the messages;
    responsive to a first member of the network identifying a specific operational condition of the first member, monitoring the shared message stream for a message related to the specific operational condition; and
    provided the shared message stream comprises a message related to the specific operational condition identified by the first member, establishing an association of the message with an indication that the first member identifies with the specific operational condition, wherein the first member is configured to establish the association.

2. The computer-implemented method of claim 1 further comprising:
    provided the shared message stream does not comprise a message related to the specific operational condition, the first member posting a message related to the specific operational condition to the shared message stream.

3. The computer-implemented method of claim 1 wherein the monitoring the shared message stream for a message related to the specific operational condition comprises:
    with respect to a specific message monitored at the first member, determining a relevance of the indicated operational condition of the specific message to the first member, the relevance being based on compatibility of the indicated operational condition to the specific operational condition; and
    in response to determining that there is compatibility of the indicated operational condition to the specific operational condition, determining that the specific message is related to the specific operational condition.

4. The computer-implemented method of claim 1 wherein the establishing an association of the message an indication that the first member identifies with the specific operational condition comprises:
    weighting the message to provide a weighted message.

5. The computer-implemented method of claim 4 further comprising:
    responsive to the weighted message attaining a predetermined weight, increasing visibility of the weighted message within the shared message stream.

6. The computer-implemented method of claim 1, wherein the message comprises a group identifier and a hash tag providing information related to the operational condition.

7. The computer-implemented method of claim 6, further comprising:
    responsive to a request for the information provided by a particular hash tag, providing access to messages comprising the hash tag across the network.

8. The computer-implemented method of claim 1 wherein the mapping the members of the network to a social network comprises:
    receiving the respective indications that particular members of the network are following other particular members of the network;
    responsive to receiving the respective indications, determining that the other particular members of the network are following the particular members of the network; and
    maintaining the mapping of the members.

9. The computer-implemented method of claim 1 further comprising:
    associating at least one subset of members of the network with a group such that the members of the at least one subset have access to a group shared message stream.

10. The computer-implemented method of claim 1, wherein the network comprises the virtualization infrastructure.

11. The computer-implemented method of claim 10, wherein the members of the network comprise:
    a system administrator;

a virtualization management server;
a plurality of hosts; and
a plurality of virtual machines;
wherein the members are arranged in a hierarchy such that the system administrator follows the virtualization management server, and the virtualization management server follows at least one of the hosts.

12. The computer-implemented method of claim 1, further comprising:
responsive to an administrative member of the network posting an administrative message to the shared message stream, performing an operation identified in the administrative message, provided the administrative member has sufficient administrative privileges to authorize the operation.

13. The computer-implemented method of claim 1, wherein the respective indications that particular members of the network are following other particular members of the network indicates that there are affiliation relationships between the particular members and the other particular members such that the other particular members of the network are following the particular members of the network.

14. A non-transitory computer readable storage medium having computer-readable program code stored thereon for causing a computer system to perform a method for facilitating management of a virtualization infrastructure, the method comprising:
mapping members of the virtualization infrastructure to a social network arranged in a hierarchy, wherein members of a first level of the hierarchy are affiliated with members of at least a second level of the hierarchy, wherein the mapping is based at least in part on respective indications that particular members of the network are following other particular members of the network, and wherein the members of the network comprise components of the virtualization infrastructure;
providing the members of the virtualization infrastructure with access to shared message streams of the social network such that the members are able to monitor messages generated by other members of the social network posted to the shared message streams, wherein at least some of the messages are indicative of operational conditions of particular other members which generated the messages;
responsive to a first member of the virtualization infrastructure identifying a specific operational condition, monitoring at least one shared message stream for a message related to the specific operational condition, wherein the message is generated by another member of a same level of the hierarchy as the first member; and
receiving an update to the at least one shared message stream with an indication that the first member has identified the specific operational condition.

15. The non-transitory computer readable storage medium of claim 14, wherein the mapping members of the virtualization infrastructure to the social network arranged in a hierarchy comprises:
associating subsets of the members are into groups, wherein the members of a group are able to access particular shared message stream associated with the group.

16. The non-transitory computer readable storage medium of claim 14, wherein the receiving the update to the at least one shared message stream comprises:
provided the at least one shared message stream comprises a message generated by another member of the same level of the hierarchy as the first member and related to the specific operational condition, establishing an association of the message with an indication that the first member identifies with the specific operational condition, wherein the first member is configured to establish the association.

17. The non-transitory computer readable storage medium of claim 16, wherein the establishing an association of the message an indication that the first member identifies with the specific operational condition comprises:
weighting the message to provide a weighted message; and
responsive to the weighted message attaining a predetermined weight, increasing visibility of the weighted message within the at least one shared message stream.

18. The non-transitory computer readable storage medium of claim 14, wherein the receiving the update to the at least one shared message stream comprises:
provided the at least one shared message stream does not comprise a message related to the specific operational condition, the first member posting a message related to the specific operational condition to the at least one shared message stream.

19. The non-transitory computer readable storage medium of claim 14, wherein the monitoring the shared message stream for a message related to the specific operational condition comprises:
with respect to a specific message monitored at the first member, determining a relevance of the indicated operational condition of the specific message to the first member, the relevance being based on compatibility of the indicated operational condition to the specific operational condition; and
in response to determining that there is compatibility of the indicated operational condition to the specific operational condition, determining that the specific message is related to the specific operational condition.

20. The non-transitory computer readable storage medium of claim 14, wherein the respective indications that particular members of the network are following other particular members of the network indicates that there are affiliation relationships between the particular members and the other particular members such that the other particular members of the network are following the particular members of the network.

21. A computer-implemented method to facilitate administration of a network of members, the method comprising:
mapping the members of the network to a social network, wherein the mapping is based at least in part on respective indications that particular members of the network are following other particular members of the network, and wherein the members of the network comprise components of a virtualization infrastructure;
at a first member of the network, monitoring messages generated by other members of the network, wherein at least some of the messages are indicative of operational conditions of particular other members which generated the messages;
with respect to a specific message monitored at the first member, determining a relevance of the indicated operational condition to the first member, the relevance being based on a compatibility of the indicated operation condition to a specific operational condition identified at the first member; and
in response to determining that there is compatibility of the indicated operational condition to the specific operational condition, weighting the specific message to provide a weighted message.

22. The computer-implemented method of claim 21 further comprising:

mapping members of the network to the social network arranged in a hierarchy, wherein members of a first level of the hierarchy are affiliated with members of at least a second level of the hierarchy.

23. The computer-implemented method of claim 22 further comprising:

associating at least one subset of members of the network with a group such that the members of the at least one subset have access to messages generated by members of the group.

24. The computer-implemented method of claim 21 further comprising:

responsive to the weighted message attaining a predetermined weight, providing the weighted message to a network administration member of the network.

25. The computer-implemented method of claim 21, wherein the respective indications that particular members of the network are following other particular members of the network indicates that there are affiliation relationships between the particular members and the other particular members such that the other particular members of the network are following the particular members of the network.

\* \* \* \* \*